United States Patent
Fukui et al.

(10) Patent No.: US 11,092,666 B2
(45) Date of Patent: Aug. 17, 2021

(54) MILLIMETER WAVE RADAR UNIT AND MOUNTING METHOD THEREFOR

(71) Applicant: TOYODA GOSEI CO., LTD., Kiyosu (JP)

(72) Inventors: Hirotaka Fukui, Kiyosu (JP); Yuhki Kuramitsu, Kiyosu (JP); Yoshiharu Tanaka, Kiyosu (JP)

(73) Assignee: TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 16/657,402

(22) Filed: Oct. 18, 2019

(65) Prior Publication Data

US 2020/0124702 A1   Apr. 23, 2020

(30) Foreign Application Priority Data

Oct. 22, 2018  (JP) .............................. JP2018-198639
Oct. 22, 2018  (JP) .............................. JP2018-198640

(51) Int. Cl.
  *G01S 7/03*   (2006.01)
  *H01Q 1/42*   (2006.01)
  *G01S 13/931* (2020.01)

(52) U.S. Cl.
  CPC ............... *G01S 7/032* (2013.01); *H01Q 1/42* (2013.01); *G01S 2013/93271* (2020.01)

(58) Field of Classification Search
  None
  See application file for complete search history.

(56) References Cited

U.S. PATENT DOCUMENTS

| 9,860,430 | B1* | 1/2018 | Penza | B60R 11/04 |
| 2003/0052810 | A1* | 3/2003 | Artis | G01S 7/03 |
| | | | | 342/1 |
| 2006/0083015 | A1* | 4/2006 | Yamazaki | H01Q 1/06 |
| | | | | 362/540 |
| 2007/0210979 | A1* | 9/2007 | Shingyoji | G01S 7/03 |
| | | | | 343/909 |
| 2014/0247614 | A1* | 9/2014 | Roberts | G09F 21/04 |
| | | | | 362/509 |
| 2015/0076851 | A1* | 3/2015 | Sugiura | B60R 13/04 |
| | | | | 296/1.08 |
| 2015/0122572 | A1* | 5/2015 | Niwa | G01S 13/931 |
| | | | | 180/271 |
| 2015/0291159 | A1* | 10/2015 | Sasabuchi | B60W 30/0953 |
| | | | | 701/1 |
| 2016/0130176 | A1* | 5/2016 | Cho | H01Q 1/3233 |
| | | | | 428/216 |

(Continued)

FOREIGN PATENT DOCUMENTS

| JP | 2011-093378 A | 5/2011 |
| JP | 2017-074818 A | 4/2017 |

*Primary Examiner* — Chico A Foxx
(74) *Attorney, Agent, or Firm* — McGinn I.P. Law Group, PLLC.

(57) ABSTRACT

A millimeter wave radar unit includes a housing including a first opening and a second opening, a millimeter wave radar mounted to the housing in such a manner as to close the first opening of the housing, and a cover including a cover main body as an emblem and being mounted to the housing in such a manner as to cover the second opening of the housing, with a millimeter wave to be emitted from the millimeter wave radar, transmitted through the cover main body and illuminate an exterior side.

18 Claims, 4 Drawing Sheets

(56) References Cited

U.S. PATENT DOCUMENTS

| | | | |
|---|---|---|---|
| 2017/0144710 A1* | 5/2017 | Frayer | H01Q 1/3233 |
| 2017/0168137 A1* | 6/2017 | Cho | C23C 14/083 |
| 2017/0291485 A1* | 10/2017 | Yasui | B60K 11/085 |
| 2017/0301982 A1* | 10/2017 | Ohtake | B29C 66/73365 |
| 2017/0352938 A1* | 12/2017 | Okumura | G01S 7/02 |
| 2018/0250856 A1* | 9/2018 | Watanabe | C23C 14/14 |
| 2018/0275269 A1* | 9/2018 | Lind | B65B 1/04 |
| 2018/0290612 A1* | 10/2018 | Ikeno | H01Q 1/3283 |
| 2019/0001901 A1* | 1/2019 | Verwys | B60R 13/005 |
| 2019/0195986 A1* | 6/2019 | Hellinger | G01S 7/032 |
| 2019/0198986 A1* | 6/2019 | Singh | H01Q 1/3233 |
| 2019/0232886 A1* | 8/2019 | Okumura | H01Q 1/02 |
| 2019/0267705 A1* | 8/2019 | Klar | B60Q 1/0023 |
| 2019/0299880 A1* | 10/2019 | Caruso | B60S 1/56 |
| 2020/0110155 A1* | 4/2020 | Cho | G01S 7/4026 |

\* cited by examiner

MILLIMETER WAVE RADAR UNIT AND MOUNTING METHOD THEREFOR

BACKGROUND OF THE INVENTION

1. Field of the Invention

The present invention relates to a millimeter wave radar unit and a mounting method therefor.

2. Description of the Related Art

Conventionally, there is known a technique which allows a radio wave called a millimeter wave to be transmitted through an emblem mounted to a front grille of a vehicle and illuminate a front side of the vehicle with that millimeter wave to detect a preceding vehicle or the like (see Patent Document 1, for example). In this technique, a millimeter wave radar to emit a millimeter wave is installed on the back side of the emblem.

The emblem to be able to transmit the millimeter wave is required to have a uniform thickness so as not to obstruct the progress of the millimeter wave, and it is complex in structure due to being subjected to decorations by uneven portion formation, coating and the like, in its interior, not its surface. For this reason, that emblem is expensive, as compared to a typical emblem that transmits no millimeter wave.

[Patent Document 1] JP-A-2011-93378

SUMMARY OF THE INVENTION

In recent years, for the purpose of protecting a vehicle body, a driver, and a collision target object in a minor collision, the front grille of the vehicle is made of a resin and is designed to absorb collision energy by being broken in the event of a collision.

According to the conventional technique such as Patent Document 1 or the like, however, there is a high possibility that the expensive emblem that is arranged to unitize a millimeter wave radar at the adjacent to the front grille to transmit a millimeter wave is broken along with the front grille in the event of a minor vehicle collision.

An object of the present invention is to provide a millimeter wave radar unit and a mounting method therefor, which are able to suppress the occurrence of a break in an emblem that is arranged to unitize a millimeter wave radar at the adjacent to the front grille to transmit a millimeter wave in the event of a minor vehicle collision.

For the purpose of achieving the above object, one aspect of the present invention provides millimeter wave radar units defined by [1] to [22] below, and millimeter wave radar unit mounting methods defined by [23] to [26] below.

[1] A millimeter wave radar unit, comprising: a housing fixed to a front grille of vehicle; a millimeter wave radar mounted to the housing; a cover mounted to the housing, the cover including a cover main body as an emblem, the cover main body being on an opposite side to the millimeter wave radar in the housing.

[2] The millimeter wave radar unit according to [1] above, further comprising a hermetic sealing structure, which is configured in such a manner as to prevent moisture or dust from ingress into the housing.

[3] The millimeter wave radar unit according to [1] above, wherein the housing includes a fixing portion, which is configured in such a manner as to be fixed to the front grille of a vehicle.

[4] The millimeter wave radar unit according to [2] above, wherein the housing includes a fixing portion, which is configured in such a manner as to be fixed to the front grille of a vehicle.

[5] The millimeter wave radar according to [1] above, wherein, when viewed in an assembling direction, sizes of members other than the cover are not larger than a size of the cover.

[6] The millimeter wave radar according to [2] above, wherein, when viewed in an assembling direction, sizes of members other than the cover are not larger than a size of the cover.

[7] The millimeter wave radar according to [3] above, wherein, when viewed in an assembling direction, sizes of members other than the cover are not larger than a size of the cover.

[8] The millimeter wave radar unit according to [1] above, wherein the cover includes the cover main body, and a cylindrical supporting member, which is contiguous to an outer peripheral side surface of that cover main body and an outer edge of a back surface of that cover main body to support that cover main body, with the supporting member including an annular housing side end portion, while the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

[9] The millimeter wave radar unit according to [2] above, wherein the cover includes the cover main body, and a cylindrical supporting member, which is contiguous to an outer peripheral side surface of that cover main body and an outer edge of a back surface of that cover main body to support that cover main body, with the supporting member including an annular housing side end portion, while the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

[10] The millimeter wave radar unit according to [3] above, wherein the cover includes the cover main body, and a cylindrical supporting member, which is contiguous to an outer peripheral side surface of that cover main body and an outer edge of a back surface of that cover main body to support that cover main body, with the supporting member including an annular housing side end portion, while the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

[11] The millimeter wave radar unit according to [4] above, wherein the cover includes the cover main body, and a cylindrical supporting member, which is contiguous to an outer peripheral side surface of that cover main body and an outer edge of a back surface of that cover main body to support that cover main body, with the supporting member including an annular housing side end portion, while the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

[12] The millimeter wave radar unit according to [11] above, wherein the outer peripheral side surface of the cover main body is provided with a recessed portion, while a surface of the supporting member that is contiguous to the outer peripheral side surface of the cover main body is provided with a protruding portion that fits that recessed portion of the cover main body with no space therebetween.

[13] The millimeter wave radar unit according to [1] above, further comprising a light emitting element configured to emit visible light, and provided within the housing, with the visible light to be emitted from the light emitting element, transmitted through the cover main body and illuminate the exterior side.

[14] The millimeter wave radar unit according to [2] above, further comprising a light emitting element configured to emit visible light, and provided within the housing, with the visible light to be emitted from the light emitting element, transmitted through the cover main body and illuminate the exterior side.

[15] The millimeter wave radar unit according to [3] above, further comprising a light emitting element configured to emit visible light, and provided within the housing, with the visible light to be emitted from the light emitting element, transmitted through the cover main body and illuminate the exterior side.

[16] The millimeter wave radar unit according to [4] above, further comprising a light emitting element configured to emit visible light, and provided within the housing, with the visible light to be emitted from the light emitting element, transmitted through the cover main body and illuminate the exterior side.

[17] The millimeter wave radar unit according to [5] above, further comprising a light emitting element configured to emit visible light, and provided within the housing, with the visible light to be emitted from the light emitting element, transmitted through the cover main body and illuminate the exterior side.

[18] The millimeter wave radar unit according to [6] above, further comprising a light emitting element configured to emit visible light, and provided within the housing, with the visible light to be emitted from the light emitting element, transmitted through the cover main body and illuminate the exterior side.

[19] The millimeter wave radar unit according to [18] above, wherein the cover main body includes a first layer made of a transparent member, which is located on a front side of that cover main body, and which includes a decorated back surface, and a second layer made of a transparent diffusing material, which is stacked on the first layer in such a manner as to cover the back surface of the first layer, with the visible light to be emitted from the light emitting element, directly enter the second layer, pass through the first layer and illuminate the exterior side.

[20] The millimeter wave radar unit according to [19] above, further comprising an annular decorating member provided contiguously to the first layer and the second layer in such a manner as to cover an outer periphery of an interface between the first layer and the second layer, with the decorating member being mechanically fixed to the second layer, with an adhesion between the decorating member and the first layer being higher than an adhesion between the first layer and the second layer.

[21] The millimeter wave radar unit according to [20] above, wherein an outer peripheral side surface of the decorating member is provided with a protruding portion, while a surface of the second layer that is contiguous to the decorating member is provided with a recessed portion that fits that protruding portion of the decorating member with no space therebetween.

[22] The millimeter wave radar unit according to [3] above, wherein the fixing portion of the housing is fixed to a plate-like shape portion of the front grille, which is protruding toward the housing from a main body of the front grille, with a break point being provided in a region adjacent to a boundary between the main body of the front grille and the plate-like shape portion of the front grille.

[23] A millimeter wave radar unit mounting method, comprising: mounting a cover including a cover main body as an emblem configured to transmit a millimeter wave to one end of a housing, and mounting a millimeter wave radar to an other end of that housing, to thereby constitute a millimeter wave radar unit; and inserting the millimeter wave radar unit in a predetermined location through a mounting hole of a front grille of a vehicle, and thereafter fixing a fixing portion of the millimeter wave radar unit to the front grille.

[24] The millimeter wave radar unit mounting method according to [23] above, wherein the fixing portion of the millimeter wave radar unit is fixed to a plate-like shape portion of the front grille, which is protruding toward the housing from a main body of the front grille, with a break point being provided in a region adjacent to a boundary between the main body of the front grille and the plate-like shape portion of the front grille.

[25] The millimeter wave radar unit mounting method according to [23] above, wherein the millimeter wave radar unit is fitted to the mounting hole of the front grille from a front side.

[26] The millimeter wave radar unit mounting method according to [24] above, wherein the millimeter wave radar unit is fitted to the mounting hole of the front grille from a front side.

Points of the Invention

According to the present invention, it is possible to provide the millimeter wave radar units and the mounting methods therefor, which are able to suppress the occurrence of a break in an emblem that transmits a millimeter wave in the event of a minor vehicle collision.

DETAILED DESCRIPTION OF THE PREFERRED EMBODIMENTS

Embodiment

Figure 1:
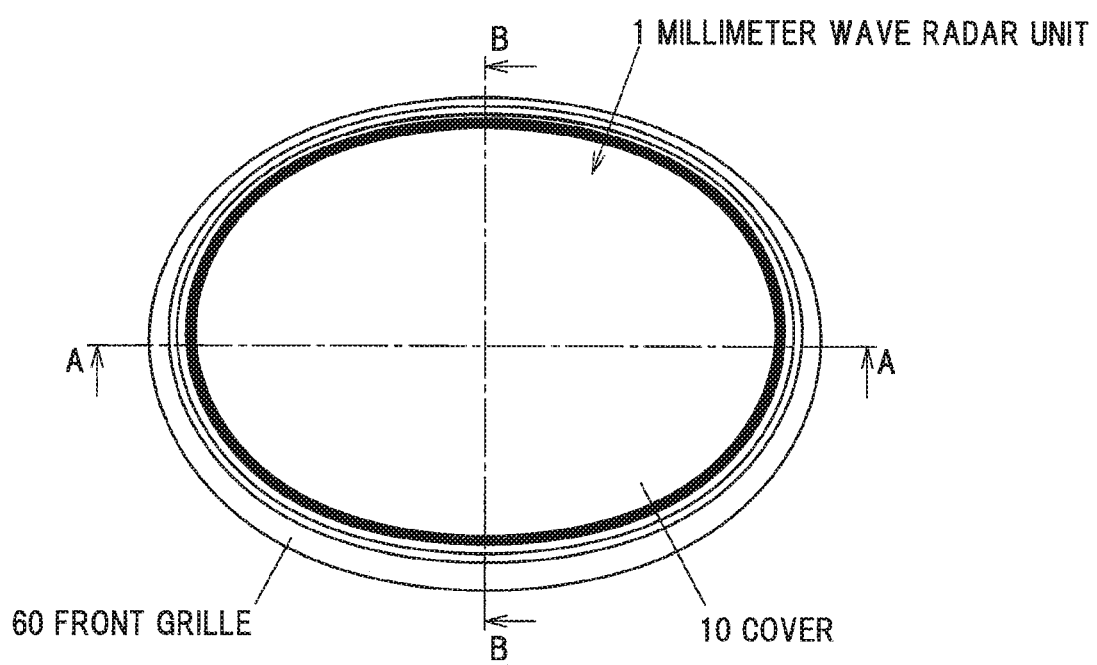
FIG. 1 is a front view showing a millimeter wave radar unit according to an embodiment.
Figure 2:
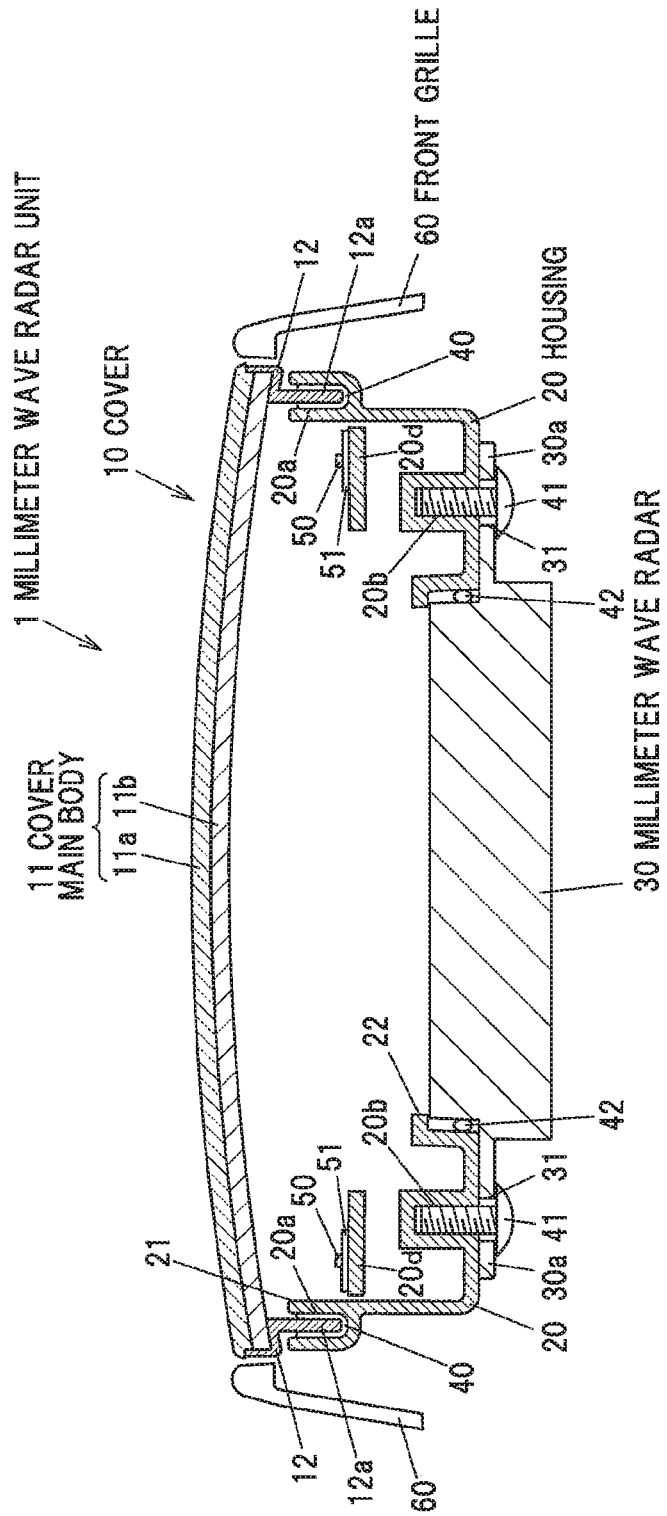
FIG. 2 is a horizontal sectional view showing the millimeter wave radar unit cut along a cutting line A-A in FIG. 1.
Figure 3:
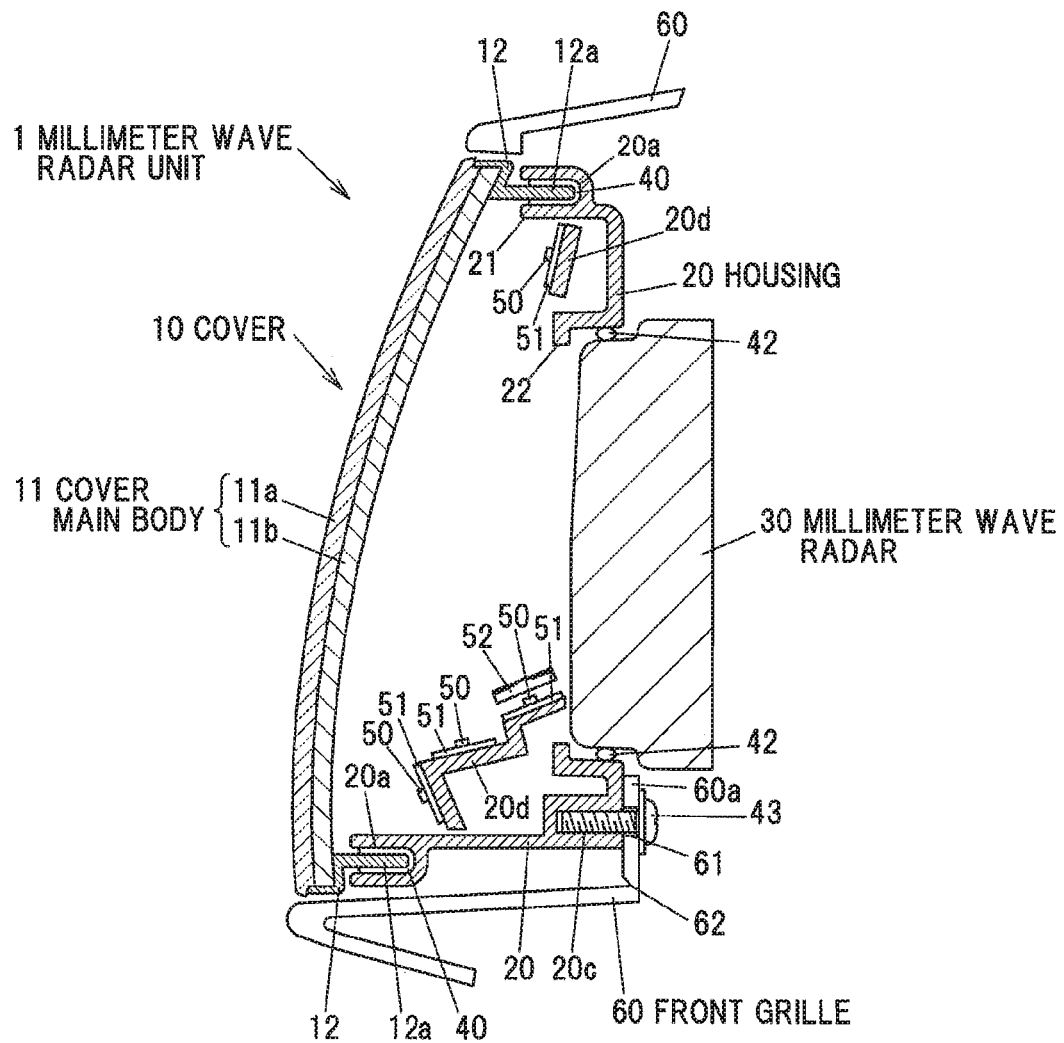
FIG. 3 is a vertical sectional view showing the millimeter wave radar unit cut along a cutting line B-B in FIG. 1.

FIG. 1 is a front view of a millimeter wave radar unit 1 according to an embodiment. FIG. 2 is a horizontal sectional view of the millimeter wave radar unit 1 cut along a cutting line A-A in FIG. 1. FIG. 3 is a vertical sectional view of the millimeter wave radar unit 1 cut along a cutting line B-B in FIG. 1.

The millimeter wave radar unit 1 is configured to include a housing 20 including an opening 21 and an opening 22, a millimeter wave radar 30 mounted to the housing 20 in such a manner as to close the opening 22 of the housing 20, and a cover 10 including a region configured to transmit a millimeter wave emitted from the millimeter wave radar 30 and being mounted to the housing 20 in such a manner as to cover the opening 21 of the housing 20.

The millimeter wave emitted from the millimeter wave radar 30 is transmitted through the cover 10 and illuminates an exterior side. The millimeter wave radar unit 1 is assembled to a front grille 60 of a vehicle in such a manner that the cover 10 is oriented to a front side of the vehicle. For this reason, the millimeter wave emitted from the millimeter wave radar unit 1 is emitted to the front side of the vehicle.

The millimeter wave radar unit 1 is fitted into a fitting hole therefor of the front grille 60 from the front side and fixed to the front grille 60. In the event of a minor collision of the vehicle, a portion of the front grille 60 coupled to the millimeter wave radar unit 1 is broken, and the millimeter wave radar unit 1 is pushed in toward the back side of the vehicle.

Since the energy caused by the collision can be released by the millimeter wave radar unit 1 being pushed in, the occurrence of a break in the millimeter wave radar unit 1 in the event of a minor collision can be suppressed. That is, the occurrence of a break in the cover 10 constituting the millimeter wave radar unit 1 can also be suppressed.

Note that, since the millimeter wave radar unit 1 is assembled to the front grille 60 from the front side of the front grille 60 so that only the surface of the cover 10 is visually recognized, it is preferable that when the millimeter wave radar unit 1 is viewed in an assembling direction thereof (in FIG. 2, the top to bottom direction, or in FIG. 3, the left to right direction, such as the thickness direction of the millimeter wave radar 30), the sizes of the members other than the cover 10 included in the millimeter wave radar unit 1 are not larger than the size of the cover 10.

Further, in the millimeter wave radar unit 1, since the cover 10 and the millimeter wave radar 30 are mounted within the same unit, the relative positional accuracy between the cover 10 and the millimeter wave radar 30 is good.

Generally, a high positional accuracy is required for the emblem and the millimeter wave radar so as to substantially prevent the emblem from obstructing the progress of the millimeter wave emitted from the millimeter wave radar. In the conventional technique, since there were a plurality of intervening members such as a vehicle body, a bumper, a front grille and the like between the emblem and the millimeter wave radar, it was difficult to perform the high precision relative positioning of the emblem and the millimeter wave radar.

In the millimeter wave radar unit 1, since the relative positioning of the cover 10 and the millimeter wave radar 30 is completed within the millimeter wave radar unit 1, the relative positional accuracy of the cover 10 and the millimeter wave radar 30 can be enhanced. Further, since the cover 10 and the millimeter wave radar 30 constituting the millimeter wave radar unit 1 can be assembled together to the vehicle, it is easy to assemble the cover 10 and the millimeter wave radar 30 to the vehicle, as compared to the conventional technique.

The cover 10 includes a cover main body 11 as the emblem, and a cylindrical supporting member 12, which is contiguous to an outer peripheral side surface of that cover main body 11 and an outer edge of a back surface of that cover main body 11 to support the cover main body 11. A typical shape of the cover 10 is a curved plate shape as shown in FIG. 2 or FIG. 3.

A partial region including a middle portion of the cover main body 11 is a millimeter wave transmission region that transmits the millimeter wave emitted from the millimeter wave radar unit 1, and at least the thickness in the millimeter wave transmission region is preferably constant. This is for preventing the obstruction of the progress of the millimeter wave being transmitted through the cover main body 11. Further, the cover main body 11 is formed with a design by decoration and serves as an emblem.

The cover main body 11 includes a first layer 11a made of a transparent member, which is located on a front side of that cover main body 11, and which includes a decorated back surface, and a second layer 11b made of a transparent diffusing material, which is stacked on the first layer 11a in such a manner as to cover the back surface of the first layer 11a. Note that the reason for the second layer 11b being made of a transparent diffusing material is to give the millimeter wave radar unit 1 a light emitting function which will be described later, and that when the millimeter wave radar unit 1 has no light emitting function, the second layer 11b may be formed of an opaque material such as a black acrylonitrile ethylene-propylene-diene styrene (AES) or the like.

Here, the decoration refers to the decoration by uneven portion formation, coloring and the like. The first layer 11a has an uneven portion in its back surface by decoration, but the second layer 11b is stacked on the back surface of the first layer 11a, in such a manner that the cover main body 11 is formed to have a constant thickness as a whole (at least in a region through which the millimeter wave is to be transmitted). Note that, in FIG. 1, the decoration by decorating the cover main body 11 is omitted.

Figure 4:
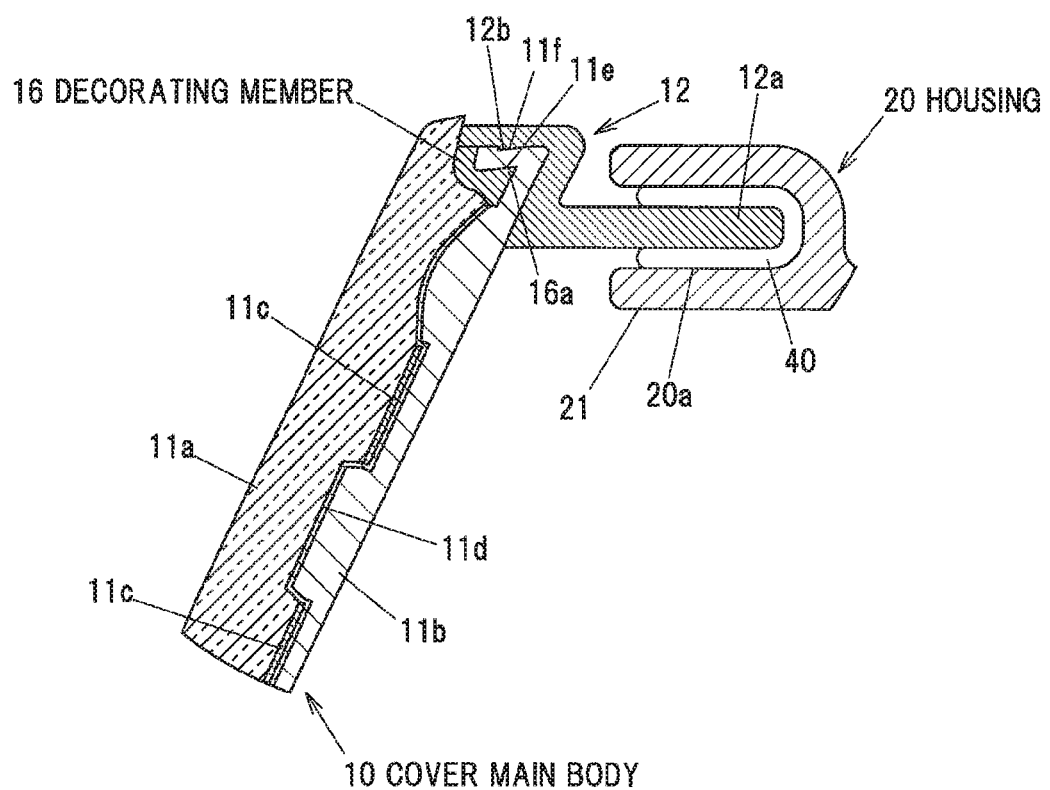
FIG. 4 is a partially enlarged view of FIG. 3.

FIG. 4 is a partially enlarged view of FIG. 3 and shows a detailed structure of the cover 10. An uneven portion is formed in the back surface of the first layer 11a, and a coating film 11c is formed on a protruding portion of that uneven portion. A metal film 11d is then formed on the entire back surface of the first layer 11a formed with the coating film 11c. The second layer 11b is stacked on the first layer 11a with the coating film 11c and the metal film 11d therebetween.

The first layer 11a is made of a transparent member such as a polycarbonate or the like. The coating film 11c is a colored film formed by applying a coating by printing or the like, and the color of the coating film 11c can be visually recognized from the exterior side. The metal film 11d is formed by metallizing, sputtering, or the like, and the metal color of the metal film 11d can be visually recognized from the exterior side. The second layer 11b is made of a transparent diffusing material such as an acrylic or the like, and is formed by insert molding or the like using the first layer 11a formed with the coating film 11c and the metal film 11d as an insert part.

Note that if the resin temperature or injection pressure during molding of the second layer 11b is too high, the decoration may be damaged, for example the coating film 11c or the metal film 11d may peel off. For this reason, it is preferable to use a material such as an acrylic or the like that is able to obtain high fluidity at a low temperature as the material for the second layer 11b.

Further, as shown in FIG. 4, it is preferable to include, in the cover main body 11, a decorating member 16 that is able to reinforce the adhesion between the first layer 11a and the second layer 11b, and protect the decorated surface constituted by the coating film 11c and the metal film 11d from ingress of water or the like. If water enters the decorated surface, the metal film 11d and the like corrode, and depending on the materials of the coating film 11c and the metal film 11d, the millimeter wave transmittivity of the cover main body 11 is impaired.

The decorating member 16 is an annular member provided contiguously to the first layer 11a and the second layer 11b in such a manner as to cover an outer periphery of an interface between the first layer 11a and the second layer 11b including the decorated surface. The decorating member 16 is a colored (including white and black) member to be used in decoration, but also has a function of reinforcing the adhesion between the first layer 11a and the second layer 11b. The decorating member 16 is mechanically fixed to the second layer 11b with a protruding portion 16a described later and the like, and the adhesion between the decorating member 16 and the first layer 11a is higher than the adhesion between the first layer 11a and the second layer 11b.

For example, when the first layer 11a is made of a polycarbonate and the second layer 11b is made of an acrylic, the polycarbonate can be used as the material for the decorating member 16. Further, when the first layer 11a is made of a polycarbonate and the second layer 11b is made of an AES, the polycarbonate can be used as the material for the decorating member 16.

Further, as shown in FIG. 4, it is preferable that an outer peripheral side surface of the decorating member 16 is provided with an anchor shape protruding portion 16a, and that a surface of the second layer 11b which is contiguous to the decorating member 16 is provided with an undercut shape recessed portion He to which the protruding portion 16a is fitted with no space therebetween. This allows the decorating member 16 to be fixed to the second layer 11b.

Further, in order to prevent the supporting member 12 from being detached from the cover main body 11 due to the weight of the millimeter wave radar 30, as shown in FIG. 4, it is preferable that an outer peripheral side surface of the cover main body 11 is provided with an undercut shape recessed portion 11f, and that a surface of the supporting member 12 that is contiguous to the outer peripheral side surface of the cover main body 11 is provided with an undercut shape protruding portion 12b that fits the recessed portion 11f with no space therebetween.

The housing 20 typically has a cylindrical shape with the opening 21 and the opening 22 at both its ends respectively. Note that, the cross-sectional shape of the housing 20 when having a cylindrical shape is not particularly limited, but that, for example, it is a circular shape, a square shape, an elliptic shape, a substantially polygonal shape, or the like. As a material of the housing 20, for example, an AES can be used. In particular, when a light emitting element 50 is mounted within the housing 20, in order to prevent light leakage, it is preferable that the housing 20 is made of a white member containing a white dye such as a titanium oxide or the like or a black member containing a black dye such as a carbon black or the like, and it is more preferable that it is made of such a black member.

The housing 20 has an annular groove 20a, to which a housing 20 side annular end portion 12a of the supporting member 12 is fitted, in a connecting portion between the housing 20 and the supporting member 12. The end portion 12a of the supporting member 12 is fitted into the groove 20a of the supporting member 12 with a waterproofing adhesive 40 such as a hot melt adhesive or the like therebetween. This makes it possible to prevent moisture or dust from ingress into the interior of the housing 20 through the space in the connecting portion between the supporting member 12 and the housing 20.

The housing 20 and the millimeter wave radar 30 are connected together by screwing, for example. In the example shown in FIG. 2, there are provided threaded holes 20b and holes 31 for screwing the millimeter wave radar 30 to the housing 20 using screws 41 respectively. The holes 31 of the millimeter wave radar 30 are provided in a plate-like shape portion 30a protruding to sides of the millimeter wave radar 30. The housing 20 and the millimeter wave radar 30 are screwed together with the screws 41 from a millimeter wave radar 30 side. There are provided screwing portions for the housing 20 and the millimeter wave radar 30 with the screws 41 in a plurality of places, for example, two places.

Further, an annular space between the housing 20 and the millimeter wave radar 30 is closed with an annular sealing member 42 such as an O-ring. This makes it possible to prevent moisture or dust from ingress into the interior of the housing 20 through the space between the millimeter wave radar 30 and the housing 20.

As described above, the millimeter wave radar unit 1 has a hermetic sealing structure with the adhesive 40 in the connecting portion between the supporting member 12 and the housing 20, and the sealing member 42 between the millimeter wave radar 30 and the housing 20, whereby moisture or dust are prevented from ingress into the housing 20. For this reason, a lowering in the radar performance of the millimeter wave radar 30 due to moisture or dust can be suppressed, and also the members within the housing 20 can be protected from corrosion or dirt due to moisture or dust.

The millimeter wave radar unit 1 is fixed to the front grille 60 in the housing 20. That is, the housing 20 has a fixing portion for fixing the millimeter wave radar unit 1 to the front grille 60. The fixing portion of the housing 20 is, for example, a portion having a threaded hole 20c shown in FIG. 3.

In the example shown in FIG. 3, the housing 20 and the front grille 60 have threaded holes 20c and holes 61 for screwing the housing 20 to the front grille 60 using screws 43, respectively. The holes 61 of the front grille 60 are provided in a plate-like shape portion 60a that protrudes from the front grille 60 to a housing 20 side. The housing 20 and the front grille 60 are screwed together with the screws 43 from a front grille 60 side. There are provided screwing portions for the housing 20 and the front grille 60 with the screws 43 in a plurality of places, for example, three places.

Further, as shown in FIG. 3, it is preferable that a break point 62, which is a locally reduced thickness portion, is provided in a region adjacent to the boundary between the main body of the front grille 60 and the plate-like shape portion 60a of the front grille 60. The break point 62 is constituted by, for example, a linear shape groove on the boundary between the main body of the front grille 60 and the plate-like shape portion 60a of the front grille 60.

The break point 62 is a portion that induces a breakage of the front grille 60 in the event of a minor collision of the vehicle. In the event of a minor collision of the vehicle, the front grille 60 is broken at the break point 62, so the millimeter wave radar unit 1 is pushed in toward the back side of the vehicle, thereby suppressing the occurrence of a break in the millimeter wave radar unit 1.

The millimeter wave radar unit 1 may have a light emitting function such that the cover main body 11 emits light. As roles of the light emission function, there are, for example a nighttime brand representation and a hospitality representation during owner (automobile owner)'s unlocking, by emblem light emission. Further, a vehicle display during automatic operation (a display which shows that the vehicle is in automatic operation) may be carried out by this light emission function.

When the millimeter wave radar unit 1 is provided with the light emitting function, as shown in FIG. 2 or FIG. 3, a light emitting element 50 to emit visible light is mounted within the housing 20, and the metal film 11d in the decorated surface of the cover main body 11 is formed by half metallizing or the like to have such a thickness as to be able to transmit the visible light, and the second layer 11b is formed of a transparent diffusing material.

The visible light emitted from the light emitting element 50 is transmitted through the cover main body 11 and illuminates an exterior side. Specifically, the light emitted from the light emitting element 50 directly enters the second layer 11b, passes through the metal film 11d and the first layer 11a, and illuminates the exterior side (the front side of the vehicle). This results in a light emission of a pattern formed by the metal film 11d, for example, an emblem mark.

In the millimeter wave radar unit 1, since the light emitting element 50 can be installed within the housing 20, and together with the cover 10, assembled to the vehicle as the millimeter wave radar unit 1, the light emitting element 50 is easy to mount to the vehicle and position relative to the cover 10. Further, since the interior of the housing 20 is hermetically sealed, a lowering in the light emission function due to the ingress of water or dust can be suppressed.

Further, in the millimeter wave radar unit 1, since the light emitted from the light emitting element 50 directly illuminates the cover main body 11, the emission intensity can be made high, as compared to when the cover main body 11 is illuminated via a light guide. This makes it possible to ensure the visual recognition of the light emission even in a bright environment such as in a daytime outdoor environment or the like.

Further, by forming the second layer 11b of a transparent diffusing material, it is possible to diffuse the light having entered the second layer 11b, suppress a variation (a granular feeling) in brightness in light emitting face resulting from directly illuminating the cover main body 11 with the light emitted from the light emitting element 50, and allow the emblem to emit light uniformly. Note that the diffusing material content in the second layer 11b is set within a range that does not obstruct the transmission of the millimeter wave emitted from the millimeter wave radar 30.

The light emitting element 50 is, for example, a light emitting diode (LED) or a laser diode (LD), and an LED is typically used as the light emitting element 50. Since the LED is a small light emitting element, and is low in power consumption, small in heat radiation amount, and long in life, the LED is suitable for use as the light emitting element 50. The light emitting element 50 is mounted on, for example, a wiring substrate 51 installed within the housing 20.

The millimeter wave radar unit 1 typically includes a plurality of the light emitting elements 50 in order to allow a somewhat wide region of the cover main body 11 to emit light. The plurality of the light emitting elements 50 are installed at various angles according to illuminating ranges of light of each of the plurality of the light emitting elements 50. Further, in order to collect light emitted from the light emitting elements 50 and illuminate a specific range (for example, a middle portion of the cover main body 11), a light collecting member 52 such as a Fresnel lens, a convex lens or the like may be used.

The light emitting elements 50, the wiring substrate 51, the light collecting member 52, and a supporting portion 20d of the housing 20 for supporting them are installed outside the millimeter wave illuminating range, so as not to intercept the millimeter wave emitted from the millimeter wave radar 30, as shown in FIG. 2 or FIG. 3.

Advantageous Effects of the Embodiment

With the millimeter wave radar unit 1 according to the above-described embodiment, since the entire millimeter wave radar unit 1 can be mounted to the vehicle in such a manner as to be pushed in toward the back side of the vehicle in the event of a minor collision of the vehicle, the occurrence of a break in the cover 10 can be suppressed in the event of a minor collision of the vehicle.

Further, with the millimeter wave radar unit 1, since the cover 10 and the millimeter wave radar 30 are mounted within the same unit, the relative positional accuracy between the cover 10 and the millimeter wave radar 30 is high, and also it is easy to assemble the cover 10 and the millimeter wave radar 30 to the vehicle.

In addition, the millimeter wave radar unit 1 has the hermetic sealing structure, so moisture or dust are prevented from ingress into the interior of the housing 20.

In addition, when the millimeter wave radar unit 1 is provided with the light emitting function, since the light emitting elements 50 can be installed within the housing 20, the light emitting element 50 is easy to mount to the vehicle and position relative to the cover 10. Further, since the interior of the housing 20 is hermetically sealed, a lowering in the light emission function due to the ingress of water or dust can be suppressed.

In addition, in the millimeter wave radar unit 1 according to the above-described embodiment, since the light emitted from the light emitting element 50 directly illuminates the cover main body 11, the emission intensity can be made high, as compared to when the cover main body 11 is illuminated via a light guide. This makes it possible to ensure the visual recognition of the light emission even in a bright environment such as in a daytime outdoor environment or the like.

In addition, by forming the second layer lib of a transparent diffusing material, it is possible to diffuse the light having entered the second layer 11b, suppress a variation (a granular feeling) in brightness in light emitting face resulting from directly illuminating the cover main body 11 with the light emitted from the light emitting element 50, and allow the emblem to emit light uniformly.

In addition, in the millimeter wave radar unit 1, since the light emitting element 50 can be installed within the housing 20, and together with the cover 10, assembled to the vehicle as the millimeter wave radar unit 1, the light emitting element 50 is easy to mount to the vehicle and position relative to the cover 10. Further, since the interior of the housing 20 is hermetically sealed, a lowering in the light emission function due to the ingress of water or dust can be suppressed.

Although the embodiments of the present invention have been described above, the present invention is not limited to the above-described embodiments, but various modifications can be carried out without departing from the spirit of the invention.

Further, the above embodiments are not to be construed as limiting the inventions according to the claims. It should also be noted that not all combinations of the features described in the embodiments are indispensable to the means for solving the problem of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

DESCRIPTIONS OF THE REFERENCE CHARACTERS

1 Millimeter wave radar unit
10 Cover
11 Cover main body
11a First layer
11b Second layer
11c Coating film
11d Metal film
11f Recessed portion
12 Supporting member
12a End portion
12b Protruding portion
16 Decorating member
16a Protruding portion
20 Housing
20a Groove
20c Threaded hole
30 Millimeter wave radar
40 Adhesive
50 Light emitting element

What is claimed is:

1. A millimeter wave radar unit, comprising:
a housing comprising a first opening and a second opening;
a millimeter wave radar mounted to the housing in such a manner as to close the first opening of the housing;
a cover comprising a cover main body as an emblem and being mounted to the housing in such a manner as to cover the second opening of the housing, with a millimeter wave to be emitted from the millimeter wave radar, transmitted through the cover main body and illuminate an exterior side, and
a light emitting element configured to emit visible light, and provided within the housing,
wherein the cover further comprises a cylindrical supporting member, which is in contact with an outer peripheral side surface of that cover main body and an outer edge of a back surface of that cover main body to support that cover main body, with the supporting member including an annular housing side end portion,
wherein the cover main body comprises a first layer comprising a transparent member, which is located on a front side of that cover main body, and which comprises decorated back surface, and a second layer comprising a transparent diffusing material, which is stacked on the first layer in such a manner as to cover the back surface of the first layer, with the visible light to be emitted from the light emitting element, directly enter the second layer, pass through the first layer and illuminate the exterior side.

2. The millimeter wave radar unit according to claim 1, further comprising a hermetic sealing structure, which is configured in such a manner as to prevent moisture or dust from ingress into the housing.

3. The millimeter wave radar unit according to claim 2, wherein the housing includes a fixing portion, which is configured in such a manner as to be fixed to a front grille of a vehicle.

4. The millimeter wave radar unit according to claim 3, wherein the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

5. The millimeter wave radar unit according to claim 2, wherein, when viewed in an assembling direction, sizes of members other than the cover are not larger than a size of the cover.

6. The millimeter wave radar unit according to claim 2, wherein the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

7. The millimeter wave radar unit according to claim 1, wherein the housing includes a fixing portion, which is configured in such a manner as to be fixed to a front grille of a vehicle.

8. The millimeter wave radar unit according to claim 7, wherein, when viewed in an assembling direction, sizes of members other than the cover are not larger than a size of the cover.

9. The millimeter wave radar unit according to claim 7, wherein the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

10. The millimeter wave radar unit according to claim 7, wherein the fixing portion of the housing is fixed to a plate-like shape portion of the front grille, which is protruding toward the housing from a main body of the front grille, with a break point being provided in a region adjacent to a boundary between the main body of the front grille and the plate-like shape portion of the front grille.

11. The millimeter wave radar unit according to claim 1, wherein, when viewed in an assembling direction, sizes of members other than the cover are not larger than a size of the cover.

12. The millimeter wave radar unit according to claim 1, wherein the housing includes an annular groove in a connecting portion between it and the supporting member to fit the annular housing side end portion of the supporting member to that annular groove of the housing, wherein the end portion of the supporting member is fitted within the groove of the housing with a waterproofing adhesive therebetween.

13. The millimeter wave radar unit according to claim 12, wherein the outer peripheral side surface of the cover main body is provided with a recessed portion, while a surface of the supporting member that is in contact with the outer peripheral side surface of the cover main body is provided with a protruding portion that fits that recessed portion of the cover main body with no space therebetween.

14. The millimeter wave radar unit according to claim 1, further comprising an annular decorating member provided contiguously to the first layer and the second layer in such a manner as to cover an outer periphery of an interface between the first layer and the second layer, with the decorating member being mechanically fixed to the second layer, with an adhesion between the decorating member and the first layer being higher than an adhesion between the first layer and the second layer.

15. The millimeter wave radar unit according to claim 14, wherein an outer peripheral side surface of the decorating member is provided with a protruding portion, while a surface of the second layer that is contiguous to the decorating member is provided with a recessed portion that fits that protruding portion of the decorating member with no space therebetween.

16. The millimeter wave radar unit according to claim 1, wherein the housing further comprises a white member comprising a white dye to prevent light leakage.

17. A millimeter wave radar unit mounting method, comprising:
   mounting a cover including a cover main body as an emblem configured to transmit a millimeter wave to one end of a housing, and mounting a millimeter wave radar to an other end of that housing, to thereby constitute a millimeter wave radar unit; and
   inserting the millimeter wave radar unit in a predetermined location through a mounting hole of a front grille of a vehicle, and thereafter fixing a fixing portion of the millimeter wave radar unit to the front grille,
   wherein the fixing portion of the millimeter wave radar unit is fixed to a plate-like shape portion of the front grille, which is protruding toward the housing from a main body of the front grille, with a break point being provided in a region adjacent to a boundary between the main body of the front grille and the plate-like shape portion of the front grille.

18. The millimeter wave radar unit mounting method according to claim 17, wherein the millimeter wave radar unit is fitted to the mounting hole of the front grille from a front side.

\* \* \* \* \*